United States Patent Office 3,518,385
Patented June 30, 1970

3,518,385
VEHICLE ANTI-FIRE SAFETY DEVICE
Jacques Boudes, Le Merentie, Batiment A/2, 124 Rue Auguste Blanqui, 13 Marseille 5°, France, and Mario Gerometta, 26 Rue des Trois Mages, 13 Marseille 6°, France
Filed Oct. 11, 1968, Ser. No. 766,736
Claims priority, application France, Oct. 16, 1967, 22,011
Int. Cl. H01h *35/14*
U.S. Cl. 200—61.45     12 Claims

ABSTRACT OF THE DISCLOSURE

A safety device for a vehicle circuit breaker, said circuit breaker being driven by the pivoting, through a predetermined angle of a tipping organ, responsive to an overthrow or a violent shock undergone by the vehicle. The tipping organ is a solid placed on the frame of the vehicle and the gravity center is situated above the support points of the solid in such a position that the smallest angle formed by the vertical line passing through the gravity center and the lines joining the gravity center to the lines joining the support points of the solid is at least equal to the smallest vehicle overthrow angle. The solid pivots, but is prevented from sliding or rising with respect to the vehicle frame.

---

The object of this invention is a safety device against fire dangers subsequent to an accident on vehicles equipped with combustion engines.

One of these objects of this invention is a device against fire dangers consecutive to accidents involving the overthrow of a vehicle in any way or position, with or without shock, or to accidents following a violent clash undergone by a vehicle with or without overthrow.

Another object of the said invention is a device with an adjustable sensibility which operates only in case of accident.

Another purpose of the invention is a device allowing to avoid the fire dangers owing to electric current supply from the battery and the current coming from a rotative generator, dynamo or alternator, which may still be driven by the engine after an accident.

Another object of the invention is a device against fire dangers owing to flames projecting from the exhaust manifolds which, eventually, may be deteriorated. This purpose is reached in breaking in the same time the circuits fed by the battery and the circuits fed by the rotative current generator, which involves the ignition breaking and avoid in the same time the spark production by the coil.

Another object of this invention is to avoid, even on the vehicles without electric ignition circuit, such as diesel engine vehicles, the fire danger owing to the risks of combustible firing by the flames coming from the exhaust. This object is reached in stopping the engine by interruption of the feeding of combustibles by means of an electrovalve closing in the absence of current.

Another object of this invention is a device operating surely in circumstance of vehicle overthrow even if the vehicle after several revolutions returns to its wheels.

Another object of this invention is a device which can be reset if, after an accident in which it has been operated, if the order of the vehicle allows it to run again.

Another object of this invention is a safety device operating not only in case of overthrow of the vehicle, but also in case of violent stops of the vehicle against an obstacle or by a violent clash undergone by the vehicle.

Another object of the said invention is a safety device against practically all fire dangers of combustion engine vehicles owing to an accident. In effect, all fire risks of combustibles owing to electric current or flames projecting from exhaust manifolds are avoided.

One of these risks, the firing of the combustible by contact of hot walls, for example, the exhaust manifold casing is a supposed danger. However, practically no outside point on the block of the engine reaches a sufficient temperature for igniting liquid combustibles.

It has been asserted, also, that sparks made by the rubbing of metallic parts on the ground in an accident may provoke the ignition of the combustibles.

Even, if sparking occurs, it will be in the circumstance where the vehicle rub in moving and the sparks will be to the rear in the moving direction and, being very fugitive, it is not very probable that they will provoke an ignition of the combustibles.

The device of the present invention is constituted by means for breaking the different sources of electric current of the vehicle and eventually its combustible feeding, which means are driven, following an overthrow or a violent shock undergone by the vehicle, by the pivoting to a predetermined angle of a tipping organ placed on a surface of the vehicle frame.

Several means are foreseen, in addition, for preventing the tipping organ from sliding on the surface and also lift up.

The gravity center position of the tipping organ in relation to its base on the surface is determined with respect to the vehicle gravity center in relation of the vehicle base on the ground in such a manner that the tipping organ stability will be at least equal to the vehicle stability and the overthrow angle of tipping organ being the smaller.

In the following drawing a preferential manner of realisation of the present invention is illustrated without limitation of the effect.

Figure 1:
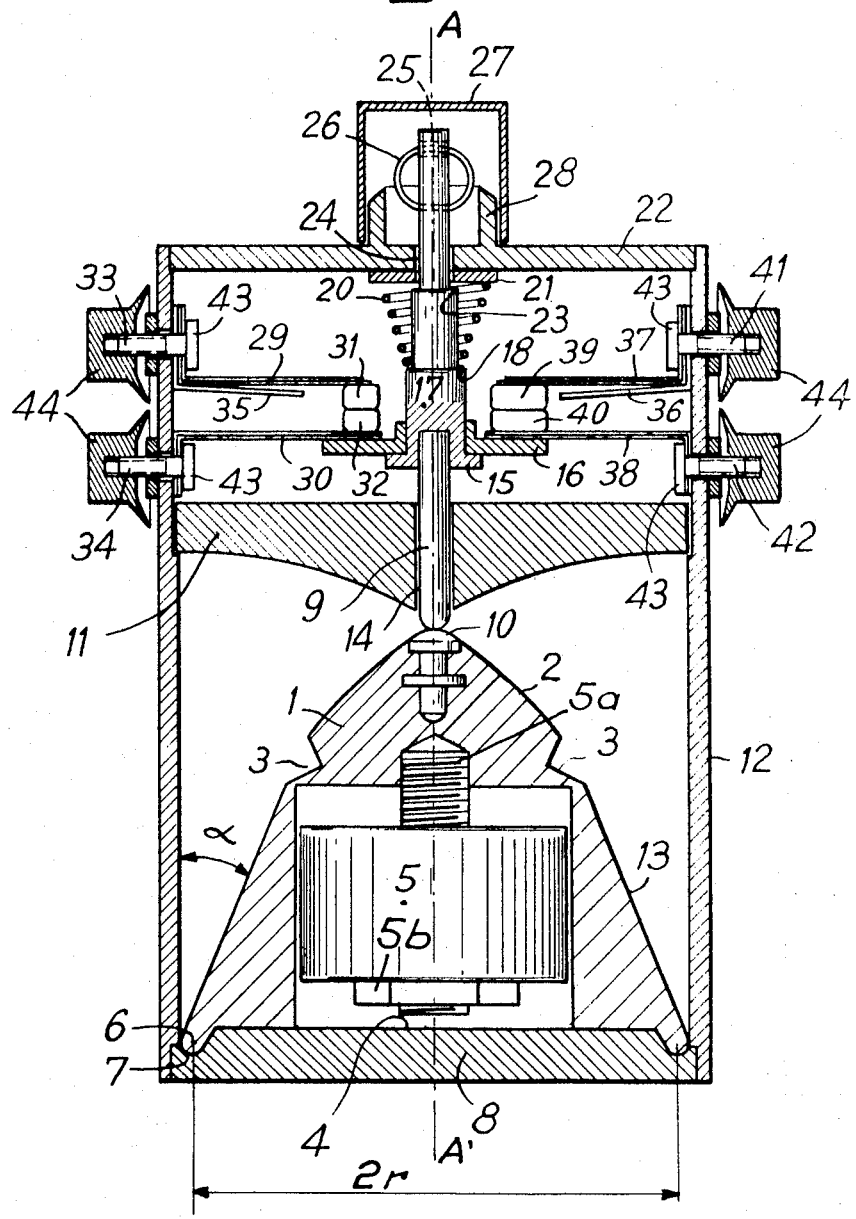
FIG. 1 is a sectional view along the axis A–A' of a device in accordance with the invention.

In FIG. 1 is shown a tipping organ 1 of general conic form, situated inside a cylindrical housing 12 fixed in vertical position on any part of the vehicle (not shown).

The tipping organ 1 is a solid of revolution about the vertical axis A–A' which is through the median plane.

Figure 4:
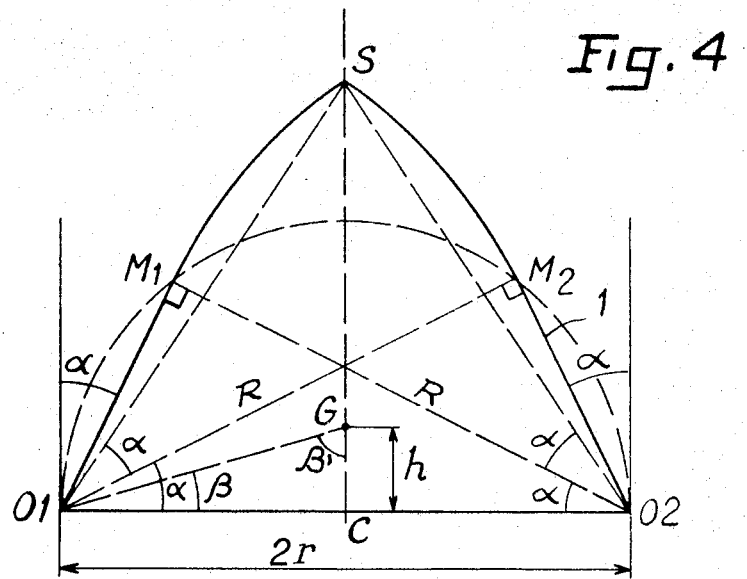
FIG. 4 is a theoretical construction of the tipping organ of the invention.

The bottom part of this organ is a blunt cone 13, limited by rectilineal generating lines forming an angle $\alpha$ with the axis, FIG. 4.

The blunt cone 13 is freely placed on its circular base 4.

The base 4 has on its periphery a projection or relief rib 6 having a general form of a half-annulus set in a toroidal concentric slot 7 channeled in the base 8 of the housing 12.

The organ 1 can pivot or tip around any point of its peripheral projection 6 with the housing 12. The organ 1 rotates around the center of the slot 7.

The projection 6 is only a particular realisation form and can be suppressed, the tipping organ would then be put on a flat base.

The top part of the organ 1 is constituted by an ogive 2 of which the generating lines situated in a center plane like the one of the figure, are circle arcs of $\alpha$ opening tangent respectively to the cone 13, and having for center the center of one of the half-circles corresponding to the intersection of the projection 6 by the median plane, located respectively on the other side of the axis of symmetry.

A circular groove 3 shaped in V is provided on the external face of the tipping organ at the level where the generating lines of the cone 13 meet the circle arcs.

The movable organ 1 may be constituted in any unchangeable material, for instance, a plastic material. A ballast 5 is provided asymmetric in relation to the organ revolution axis. The purpose of this ballast is to set the gravity center height G of the assembly made by the tipping organ 1 and the ballast 5 in relation to the base or more precisely in relation to the horizontal plane including the annulus axis, made by the projection 6.

This ballast can be fitted in the tipping organ 1 in such a manner, that it will be possible to change its distance to the base. For instance, it can be constituted by a cylindric sleeve, bored by tapped hole and screwing on a tapped axis located in relation to the tipping organ axis. Check-nuts allow to secure it in a determined position. These dispositions allow to vary, at will, the gravity center height and to set the device sensibility.

We shall call $h$ the distance of the gravity center G to the base and $r$ the radius of the half-annulus axial circle.

It is seen that, when the tipping organ will be inclined in such a position that the vertical line, passing by the gravity center, pass out the circle of $r$ radius, the organ balance will be broken and it will tip, in relation to the housing 12, to an angle $\alpha$ and rest on the walls of the housing 12.

This will happen when G will be located at the vertical of any point of the horizontal circle of center $r$; so when the housing pivots an angle $$\beta' = \frac{\pi}{2} - \beta$$

such that tg $\beta = h/r$ or $\beta' = $ arc tg $r/h$. The $\beta'$ angle is the overthrow angle of the tipping organ 1.

FIG. 1 shows, in addition, inside the housing 12, a revolution part 11, bored with an axial hole 14 in which passes a needle 9. The lower edge of this needle 9 is supported in rest position on the ogive top 2. If the organ 1 is in plastic material, the ogive top can be stiffened by a metallic part 10 embedded in the organ 1, having a rounded edge in preference. The needle 9 is metallic and its lower edge is a rounded edge in preference and has a surface perfectly levelled and polished in such a manner that the friction forces made by the needle 9 on the ogive 2 are very slight. In all manners, these friction forces, when the organ 1 tips are normal on the ogive surface, which is formed by circle arcs centered on the horizontal circle of radius $r$. So they will not have any influence on the organ tipping, because, in all positions of the organ, they will pass by the pivoting axis of this organ.

The inside face of the part 11 can be shaped in a preferential mode, but not obligatory, by a revolution surface around the symmetric axis of the device shaped in each center plane of two segments centered on those of the axial circle intersections of the base projection 6 with the said center plane, located on the same side of the device axis. The segments lengthen the ogive zones with a minimal clearance and when the organ 1 tips, the ogive slides on these surfaces and is guided thereby.

This embodiment is not obligatory and experience shows that the leading of the tipping organ, by the part 11, is not indispensable.

The needle 9 is covered by a part 17 bearing a shoulder 18 on which bears a coil spring lower edge 20 and the other edge bears on the housing cover 22 by means of a washer 21.

The spring 20 maintains the needle 9 on the ogive top 2 in a normal position.

Figure 2:
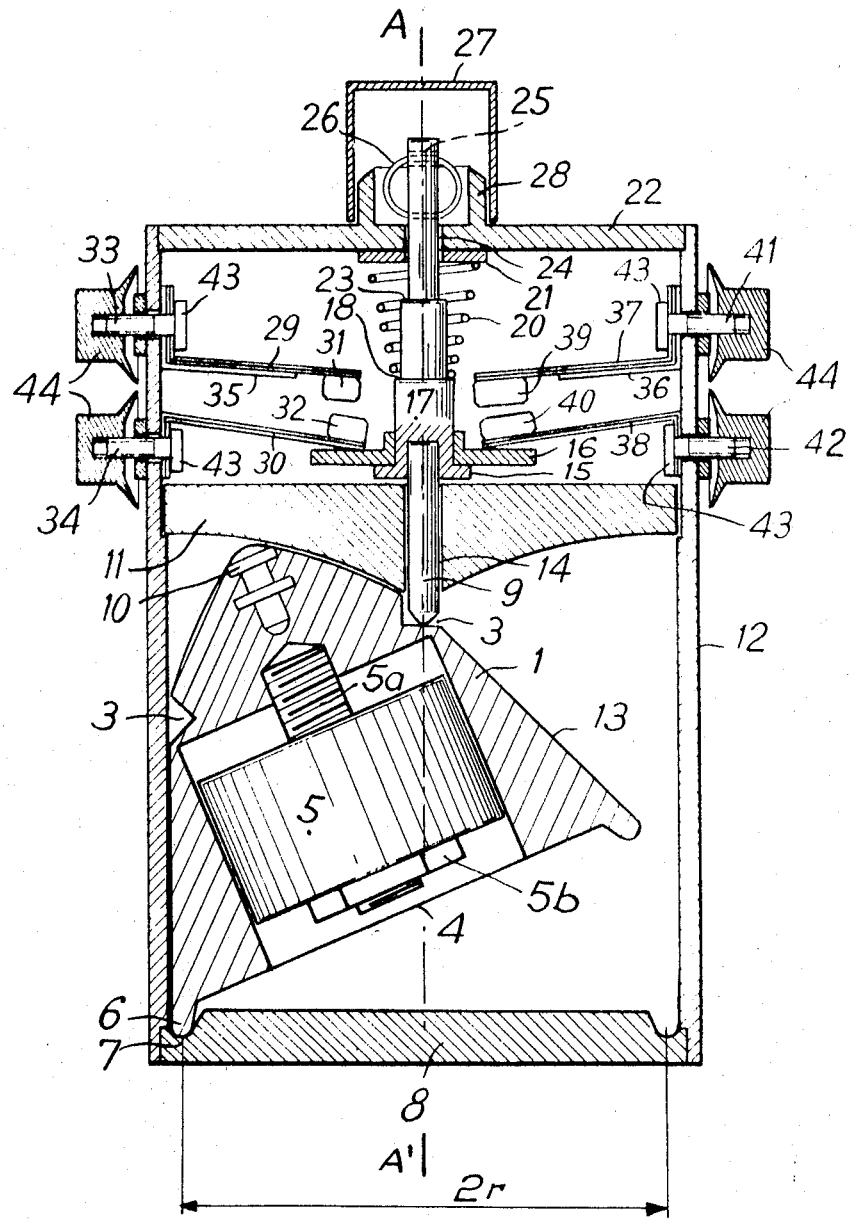
FIG. 2 is a view corresponding to FIG. 1 of the device after an accident.

When the organ 1 tips, the spring 20 pushes the needle into the circular rib 3 as shown in FIG. 2.

The part 17 passes through the cover 22 by means of a central hole 24 which is ended by a hole 25 in which is passed a ring 26 for reclosing the device.

A tight transparent cap 27 is seated in the flange cover 28 and covers the reclosing ring.

The device shown in FIG. 1 is fitted with two electric circuit breakers.

One of these has a contact 31 of the conductive flexible blade 29 held in the opening by the check-blade 35.

The other contact 32 of the elastic and conductive blade 30 rests on an insulated washer 16 maintained on the part 17 by the flange 15.

The blades 29 and 30 are connected on the external terminals 33 and 34, which are fitted "in series" on one of the circuits it is desired to open, in case of accident, by operation of the tipping organ 1. This may be the rotative electric generator circuit.

The terminals 33 and 34 have heads 43 inside the housing for attaching the flexible blades. Insulated caps 44 cover the terminals 33 and 34.

In the same manner, the second circuit breaker is constituted by two contacts 39 and 40, joined by conductive and flexible blades 37 and 38 with two external terminals 41 and 42 which are in series in a second circuit to be automatically opened in case of an accident. For instance, these two terminals may be connected to the battery terminal. Of course, the quantity of circuit breakers may be increased to break other circuits.

To explain the working of the device when the organ 1 is pivoting, we refer to FIG. 2.

The organ 1 pivots in relation to the housing 12 in an angle $\alpha$ and comes to rest, by a generating line of the cone 13, on the housing walls.

The needle 9 comes down in the slot 3 by the spring pressure 20 and the organ 1 is locked in this position.

The motion of the needle 9 frees the electric contacts 31, 32 and 39, 40 which open by action of the flexible blades 30 and 38.

For resetting, when all fire danger has disappeared and the vehicle order permits running again, it is sufficient to pull the ring 26, the needle 9 comes out of the slot 3 and re-establishes the electric circuits.

The tipping organ 1 comes back into its balance position, since it is presumed that the vehicle has been previously put again on its wheels and the needle 9 is locked by the ogive end 10 in the up position, FIG. 1.

We shall examine now the operation of the device in a static situation, in relation to the vehicle position or in relation to dynamic stresses undergone by the vehicle.

About the static situation we shall discuss as an example a four wheel vehicle, which is the most frequent case and we shall consider the lateral stability of this vehicle. It is known that the overthrow of the vehicle occurs most frequently on the side.

Figure 3:
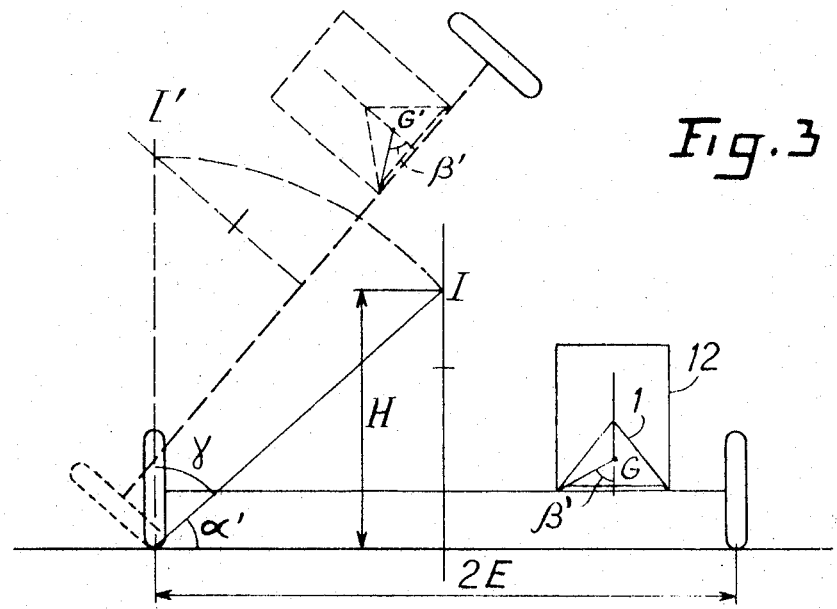
FIG. 3 is a view of the angular relationships for a vehicle in width.

FIG. 3 shows diagrammatically a transverse view of the vehicle and its gravity center I.

We designate by H the gravity center height in relation to the ground, by 2E the wheel width of the vehicle and by $\alpha'$ the angle of which the tangent is equal to $H/E$.

FIG. 3 represents in dotted line the vehicle just at the time when it is ready to overthrow, i.e.: at the time when the gravity center I passes out of the lift polygon and is situated at the vertical of a wheel contact point to the ground. The lift polygon is the polygon formed by connecting the points of support of an object on a surface.

This is produced when the vehicle has pivoted in an angle $$\gamma = \frac{\pi}{2} - \alpha'$$

thus $\gamma = $ arc tg $E/H$. The angle $\gamma$ is called overthrow angle of vehicle.

Consider now the tipping organ 1 of the present invention in the housing 12 in a vertical and rest position on any place on the frame of the vehicle.

We have already seen that this tipping organ 1 will tip when the housing will turn in an angle $\beta'$=arc tg $r/h$, $h$ being the gravity center G height of the tipping organ in relation to its base and $r$ the base radius.

In adjusting the height $h$ it is so possible to vary the tipping organ stability and to suit it to that of the vehicle.

This height is adjusted in such manner that the ratio $h/r$ is lower than the ratio $H/E$ so that the tangent of the angle $\beta'=r/h$ is upper to the tangent of the angle $\gamma=E/H$ and the tipping organ tips only when the vehicle has already passed its balance position. Thus, it positively avoids any untimely working of the safety device in static conditions, that is, with any width profile of the ground on which this vehicle is in balance.

For the longitudinal stability, i.e. the rotation of the vehicle around one of its axles, the device will operate in the same order. However, it must be observed that, in practice, this circumstance is less frequent and it happens nearly always after the shock of the vehicle against an obstacle.

The operation of the safety device will be then driven by the dynamic effects.

In the circumstance where the vehicle undergoes a sudden reduction of speed, the kinetic energy of the tipping organ involves the organ 1 in rotation around a point of its base corresponding to the direction of the vehicle.

A part of this kinetic energy is absorbed by the tipping organ pressure against the housing walls, and a part of the vehicle kinetic energy is absorbed by the obstacle. The mathematical study of the dynamic operation is very complicated.

Experience shows that a ratio $h/r$ lower than the vehicle ratio $H/E$ suits to dynamic as well as static and does not involve an undesirable device operation, even in case of sporting driving, brutal braking, or varied and hilly road.

The device of the present invention works also when a violent shock happens to the vehicle which is stopped. In this circumstance the tipping organ pivots by its inertia effect in a reverse way to the shock direction and the sensibility is so much more higher than the tipping organ gravity center is removed from the base.

The described device is well adapted for fire protection of combustible engine vehicles.

It can also be adapted to aircraft by the addition of a locking device during flight, which freed just at the time of takeoffs and landing.

Tests have been realised on a prototype, mounted on an automobile and have shown the good operation of the device, under static conditions, even if the half annulus shaped projection 6 and the corresponding slot 7 are eliminated.

The tipping organ is then placed directly on its base and supported against the lateral walls of the housing.

In another realisation mode, the tipping organ 1 can be a reduced model of the vehicle with respect to its lift polygon.

The tipping organ lift polygon homothetically reproduces at a reduced scale, the vehicle lift polygon.

If the vehicle gravity center homologous point it considered, in the same homothetic transformation, the gravity center G of the tipping organ will be situated above the tipping organ base surface, on the surface or inside a volume having for top the said homologous point and of which generating lines pass by the lift polygon in such a manner that the static stability of the tipping organ is at least equal in any direction to the vehicle stability.

What is claimed is:

1. A safety device for avoiding the occurrence of fire as the result of accidental ignition of the fuel supply of an internal combustion engine, said device comprising: a housing defining a horizontal floor, a tipping member comprising a relatively heavy body resting upon points of said floor which define a plane and able to tip freely in all directions relative to said floor, a rod slidably mounted for reciprocal movement along an axis perpendicular to said floor, a spring means constantly urging said rod in one axial direction towards a surface portion of said body, electrical switch means actuated by said rod in accordance with axial movement thereof, said surface portion of said body being in sliding engagement with an end of said rod and said surface portion being configured whereby tilting of said body is accompanied by axial displacement of said rod pursuant to the end of said rod remaining in contact with said surface.

2. The device of claim 1, said switch means being part of an electrical circuitry, said device being arranged whereby tilting of said body relative to said floor is accompanied by an axial displacement of said rod as aforementioned and a corresponding actuation of said switch means so as to prevent the flow of any current through said circuitry.

3. The device of claim 2 associated with an internal combustion engine having a fuel supply, said circuitry being arranged to interrupt the flow of fuel to said engine from said fuel supply pursuant to tilting of said body and the consequent actuation of said switch means by said rod.

4. The device of claim 3 wherein said engine is the driving engine of a vehicle which also comprises an electrical system, said switch means being arranged to prevent the flow of any current through said system pursuant to tilting of said body and the consequent actuation of said switch means by said rod.

5. The device of claim 4, said vehicle being unstable when tilting thereof occurs beyond the vehicle overturn angle, said body normally resting upon points of said floor which define the corners of a polygon, the center of gravity of said body being at a height above said floor such that the smallest angle formed between a line passing through said center of gravity and which is perpendicular to said floor, and each of the lines which join said center of gravity with the respective corners of said polygon, is at least equal to said overturn angle.

6. On a vehicle including an internal combustion engine and at least four wheels which define a support plane for supporting the vehicle from the ground, wherein the maximum transverse distance between two wheels located upon the same axle is equal to $2E$ and the height of the vehicle center of gravity above ground is equal to H, an anti-fire safety device comprising: a cylindrical housing rigidly fastened to said vehicle and having an axis of revolution which is perpendicular to the support plane defined by the vehicle wheels, a tipping member within said housing comprising a surface of revolution whose axis coincides with that of the housing, said housing defining a floor perpendicular to said axis thereof and said member resting on said floor along points defining a base circle of radius $r$ whereby said member is free to pivot freely in all directions relative to said floor, a rod slidably mounted in said housing for reciprocal movement along an extension of said axis, an end of said rod bearing against a surface portion of said member and including resilient means constantly urging said rod axially towards said surface portion, electrical switch means actuable to interrupt the fuel supply to said engine, said switch means being actuable by said rod pursuant to axial displacement thereof, said rod moving axially pursuant to tilting of said member, the height of the center of gravity of said member above said floor being $h$, the ratio of $h:r$ being no greater than the ratio of $H:E$.

7. The vehicle of claim 6, including an electrical system, said switch means being actuable to prevent the flow of any current through said system.

8. The safety device of claim 1, said body being defined by a surface of revolution whose axis is perpendicular to said floor, said surface of revolution comprising a conical frustum portion surmounted by an ogive portion which as seen in vertical cross-section is defined by circular arcs all of the same radius and tangent to the generatrix of the cone, said arcs all coming together to form an apex of said body, a circumferential groove being disposed along said surface in a plane perpendicular to said axis.

9. The safety device of claim 8, the axis of said rod coinciding with the axis of revolution of said body, said groove being at the junction between said ogive and said frustum whereby said groove assumes a position along said axis pursuant to tipping of said body, said rod thereby entering into said groove and locking said body in tipped position, means for withdrawing said rod from said groove to permit return of said body to its untilted position.

10. The safety device of claim 8, including a stationary guide member in said housing above said body, said guide member having a surface which faces said body and which is defined by circular arcs complementary to the circular arcs of said ogive portion whereby said ogive portion may slide along said guide member surface whenever said body tilts.

11. The safety device of claim 1, including a ballast weight of higher density material than the remainder of said body incorporated within a cavity of said body symmetrically relative to the points of support thereof.

12. The safety device of claim 11, said cavity within said body being of an axial height greater than the axial height of said ballast weight, means for varying the axial position of said weight relative to said body so as to alter the height of the center of gravity of said body.

References Cited

UNITED STATES PATENTS

| 2,780,688 | 2/1957 | Stec | 200—61.52 |
| 2,806,916 | 9/1957 | Gibble | 200—61.45 |

FOREIGN PATENTS

| 486,024 | 5/1938 | Great Britain. |
| 515,399 | 2/1938 | Great Britain. |

ROBERT K. SCHAEFER, Primary Examiner

M. GINSBURG, Assistant Examiner